Dec. 11, 1934.  G. PIRICH  1,983,873
WEEDING TOOL
Filed June 21, 1934
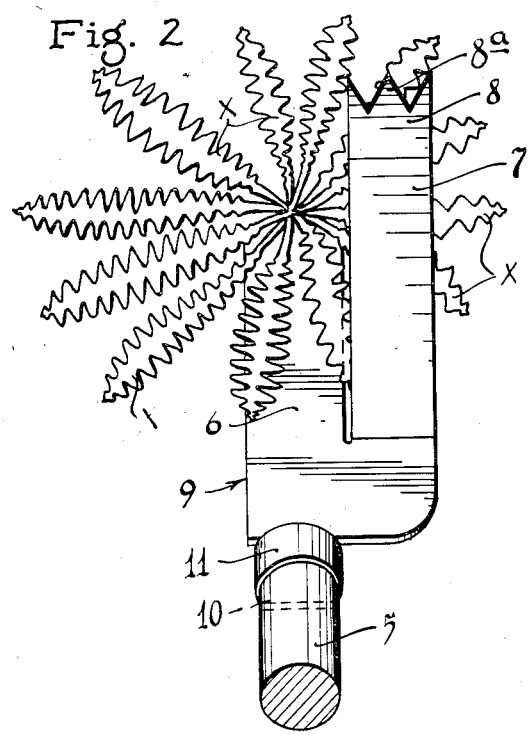
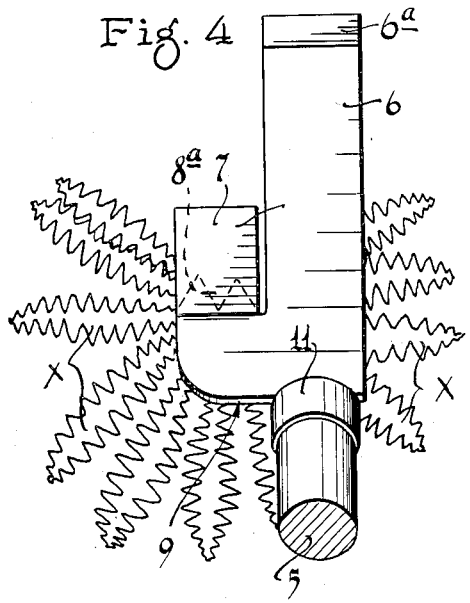
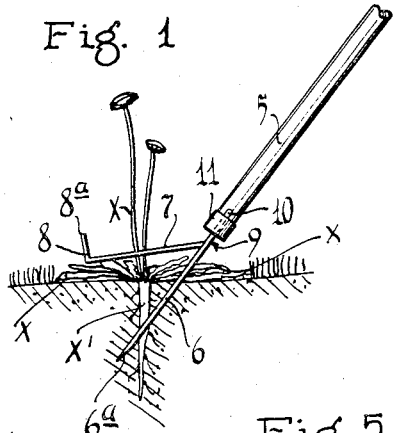
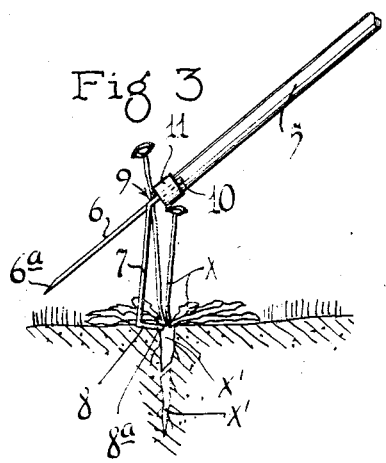
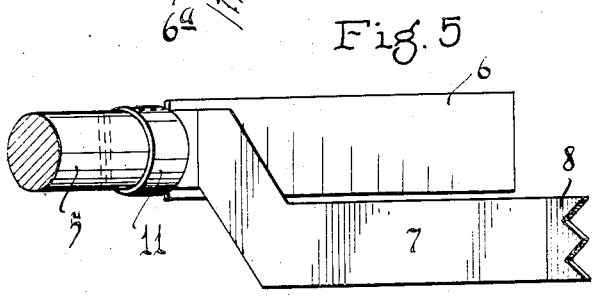
INVENTOR
George Pirich
By His ATTORNEYS Patented Dec. 11, 1934

1,983,873

UNITED STATES PATENT OFFICE 1,983,873

WEEDING TOOL

George Pirich, Minneapolis, Minn.

Application June 21, 1934, Serial No. 731,633

2 Claims. (Cl. 55—65)

My invention relates to improvements in weeding tools and has as its main object the provision of an extremely simple and highly efficient device of the class described.

The improved weeding tool is especially adapted for individual removal of dandelions and other obnoxious weeds and, due to its efficient design, renders removal of such obnoxious plants easily and quickly accomplished without disturbing soil or desirable plant life, such as grass, closely adjacent thereto.

Generally stated, the invention consists of novel devices, combinations of devices and arrangement of parts hereinafter described and defined in the claims.

In the accompanying drawing, which illustrates the invention, like characters indicate like parts throughout the several views.

Referring to the drawing:

Fig. 1 is a view in side elevation illustrating operation of the tool as a root cutter;

Fig. 2 is a perspective view illustrating the head of the tool as it appears looking from the rear end of the stem forwardly and downwardly thereon when positioned as shown in Fig. 1;

Fig. 3 is a view in side elevation illustrating the tool rotated 180° in respect to Figs. 1 and 2 and being positioned to extract a cut root;

Fig. 4 is a view taken similar to Fig. 2 but illustrating the tool as positioned in Fig. 3; and Fig. 5 is a plan view illustrating a modfication of the tool.

The weeding tool comprises a handle-acting stem 5, a weed root-cutting blade 6, projecting outwardly from one end of the stem 5, and provided at its free end with a cutting edge 6a, and a rake arm 7 that projects from the stem anchored end of the blade 6 in diverging relation to a face of the cutting blade 6 and the stem 5. This arm 7 is offset, at its free end, in a direction away from the plane of the blade 6 to afford a weed-extracting rake head 8.

Preferably, and as illustrated, the cutting blade 6 and rake arm 7 are integrally formed from a flat sheet of steel which is longitudinally slit to provide laterally spaced primarily parallel blades 6 and rake arm 7, the rake arm 7 being bent into diverging relation to the blade 6 and stem 5 and the free end of the arm 7 being offset to form the rake head 8 in a subsequent operation. Also, in the preferred embodiment of the invention illustrated, the rake head 8 is serrated to afford a plurality of V-shaped rake teeth 8a.

Above the rake arm 7 the head of the tool, indicated as an entirety by 9, is provided, preferably in alignment with the blade 6, with an anchoring shank 10 that is inserted into the stem 5 and firmly clamped against displacement by a suitable clamping band or ferrule 11.

In use the tap root X' of a weed, such as a dandelion X, is first cut, preferably two to four inches below the ground surface, by inserting the blade 6 diagonally into the ground and through the root as illustrated in Figs. 1 and 2, and then the blade is withdrawn, the head turned completely over, and the weed, including its foliage and all of the root about the cut, is raked out by employing the tool as illustrated in Figs. 3 and 4. Adjacent teeth 8a of the rake head grip the tap root X' just below the foliage and render extraction of the cut tap root easily and readily accomplished without displacing or disturbing adjacent plants or soil.

By reference to the drawing, it will be seen that the rake arm 7, due to its diverging relation to the stem 5 and cutting blade 6, will not interfere in any way with free insertion of the blade into the ground. Further it will be seen that the rake arm, due to its laterally offset relation to the cutting blade, will not obstruct the operator's view of the cutting blade from a naturally assumed standing position directly behind and in a line with the stem 5 and blade 6 and, therefore, will not in any way hamper the operator in properly positioning the blade 6 in respect to a tap root.

It will likewise be apparent that the cutting blade 6 will not obstruct the operator's view of the rake arm while using the rake to extract a root.

If desired, the blade 6 and rake arm 7 may be independently formed, as shown in Fig. 5, in which said elements are each provided with a similar anchoring shank 10. These anchoring shanks are arranged in face to face relation and clamped in the stem in the manner described in connection with the preferred embodiment of the invention previously described.

What I claim is:

1. A weeding tool comprising a stem, a root cutting blade extending outwardly from one end of the stem, and an arm projecting from same end of the stem in diverging relation to one face of the cutting blade and having its free end portion offset in a direction away from the said face of the cutting blade to afford a weed-extracting rake head, said arm, outward of the stem, being laterally offset from the blade and stem to expose the adjacent face of the cutting blade.

2. A weeding tool comprising a stem, a root cutting blade extending outwardly from one end of the stem, and an arm projecting from same end of the stem in diverging relation to one face of the cutting blade and having its free end portion offset in a direction away from the said face of the cutting blade to afford a weed-extracting rake head, said cutting blade and rake arm being integrally formed from flat metal longitudinally slit to form laterally spaced blade and arm.

GEORGE PIRICH.